US006997691B2

(12) United States Patent
Trebbi et al.

(10) Patent No.: US 6,997,691 B2
(45) Date of Patent: Feb. 14, 2006

(54) TABLET PRESS MACHINE

(75) Inventors: Roberto Trebbi, Castenaso (IT); Hans Kramer, Köln (DE)

(73) Assignee: I.M.A. Industria Macchine Automatiche S.p.A., Bologna (IT)

( * ) Notice: Subject to any disclaimer, the term of this patent is extended or adjusted under 35 U.S.C. 154(b) by 140 days.

(21) Appl. No.: 10/468,157

(22) PCT Filed: Mar. 12, 2002

(86) PCT No.: PCT/IB02/00741

§ 371 (c)(1),
(2), (4) Date: Aug. 27, 2003

(87) PCT Pub. No.: WO02/074528

PCT Pub. Date: Sep. 26, 2002

(65) Prior Publication Data

US 2004/0067275 A1 Apr. 8, 2004

(30) Foreign Application Priority Data

Mar. 16, 2001 (IT) ............................ BOO1A0141

(51) Int. Cl.
*B29C 43/08* (2006.01)

(52) U.S. Cl. .......................... 425/73; 425/78; 425/210; 425/345

(58) Field of Classification Search .................. 425/73, 425/78, 210, 225, 231, 345, 353–355
See application file for complete search history.

(56) References Cited

U.S. PATENT DOCUMENTS 3,029,752 A 4/1962 Frank (Continued)

FOREIGN PATENT DOCUMENTS

EP 0 823 324 A1 11/1998

OTHER PUBLICATIONS

Patent Abstract of Japan 63299893 Dec. 7, 1988; Inventor Kokuryo Hiroshi; "Dust Collecting Apparatus for Rotary Type Powder Compacting Machine".

(Continued)

*Primary Examiner*—James P. Mackey
*Assistant Examiner*—Thu Khanh T. Nguyen
(74) *Attorney, Agent, or Firm*—Arent Fox PLLC

(57) ABSTRACT

A tablet press machine (1) includes a fixed casing (2) which houses a compression assembly (3) comprising a power-driven rotor (4) that rotates about an axis (5), the rotor including a matrix disc (6) and another two discs (7, 8) on both sides of it, mounting two sets of reciprocating punches (9, 10) opposite and aligned with each other in pairs. The matrix disc (6) has a plurality of through matrixes (11) where the reciprocating punches (9, 10) forming each pair are mounted in such a way as to delimit between them an empty space (12) of variably size designed to contain a dosed quantity of powder to be compressed. Two sets of cams (13, 14) are associated with the compression assembly (3) and, as the rotor (4) rotates, impart on the punches (9, 10) a driving motion which moves them cyclically towards and away from each other in such a way as to compress the powder contained in the matrix (11) in the matrix disc (6). The casing (2) comprises, inside it, sealed separating means (15; 18, 19, 21, 22) desigend to delimit separate spaces (16, 17, 20) for housing the compression assembly (3) and the sets of cams (13; 14) in order to prevent the powdered product from contaminating the cams.

16 Claims, 5 Drawing Sheets

U.S. PATENT DOCUMENTS

| | | | | |
|---|---|---|---|---|
| 3,999,922 | A | 12/1976 | Shimada | |
| 4,259,049 | A * | 3/1981 | Willich | 425/73 |
| 4,408,975 | A * | 10/1983 | Hack | 425/231 |
| 4,943,227 | A * | 7/1990 | Facchini | 425/345 |
| 4,988,275 | A | 1/1991 | Hinzpeter et al. | |
| 5,462,427 | A * | 10/1995 | Kramer | 425/231 |
| 5,882,696 | A | 3/1999 | Fabbri | |
| 5,928,590 | A | 7/1999 | Fabbri | |
| 6,830,442 | B1 * | 12/2004 | Cecil | 425/345 |

OTHER PUBLICATIONS

Patent Abstract of Japan 08099199 Apr. 16, 1996; Inventor Kamimura Minoru; "Device for Washing Rotary Disk Unit in Rotory Powder Compressive Forming Machine".

* cited by examiner

TABLET PRESS MACHINE

CROSS-REFERENCE TO RELATED APPLICATION

This application is a National Stage entry of International Application No. PCT/IB02/00741 filed Mar. 12, 2002, the entire specification claims and drawings of which are incorporated herewith by reference.

1. Technical Field

The present invention relates to a tablet press machine used for the production of tablets, especially, but without restricting the scope of the invention, pharmaceutical tablets made from suitably prepared and dosed solid substances in powder or granular form.

In particular, the invention relates to a tablet press of known type including a compression assembly comprising a rotor that is rotatably housed in a casing or fixed structure.

2. Background Art

The rotor includes a matrix disc and another two discs on both sides of it, each mounting a set of reciprocating punches opposite and aligned with a corresponding set of punches on the other disc, so as to form a plurality of pairs of punches.

The matrix disc also has a plurality of through matrixes where the pairs of reciprocating punches are mounted in such a way as to delimit an empty space of variable size between the punches in each pair and designed to contain a dosed quantity of powder.

The compression assembly is associated with a first and a second set of cams which, as the rotor rotates, impart on the punches a driving motion which moves the individual punches in each pair cyclically towards and away from each other in such a way as to compress the powder contained in each matrix of the matrix disc to form a customary tablet.

In order to keep a tablet press of this type perfectly clean and in efficient working order to comply with the stringent standards of sterility required by the pharmaceutical industry, the compression assembly, in one prior art solution described in U.S. Pat. No. 4,988,275, is connected to the cams in such a way that it can be lifted out of the fixed casing together with the cams en bloc to enable the machine, at the end of a production cycle, to be quickly re-equipped and cleaned ready for pressing another product differing from the product previously processed.

In other words, with the exception of the parts used to mechanically transmit to the rotor the drive motion generated by drive parts that are outside the compression assembly, the entire compression assembly—in the solution cited above—can be removed together with the cams, as a single unit, so as to facilitate the washing, drying and sterilising of both the inside of the casing and of the compression assembly itself.

Thus, the structural unit consisting of the compression assembly and cams can be lifted out en bloc and disassembled outside of the machine for cleaning, sterilising or re-equipping, while production can continue almost immediately using another identical structural unit which has been prepared before the removal of the first structural unit. This greatly reduces the down time required for cleaning, sterilising and re-equipping the machine and minimises the ratio of down time to total production time.

Although, a tablet press machine structured in this way has proved to be a significant improvement over machines existing prior to its disclosure, the need for further improvement is still felt. The fact that the parts used for mechanical transmission of drive still remain in place is a disadvantage because much time is still needed to clean them, removing powdered product residue and the lubricant which is essential for their correct operation but which is contaminated by the powdered product being processed, and to apply clean lubricant before reassembling and starting up the tablet press for another production cycle.

DISCLOSURE OF THE INVENTION

It is therefore an aim of the present invention to overcome the above mentioned disadvantages.

In particular, the present invention has for an aim to provide a tablet press machine where changeover to a new product is further simplified and speeded up by reducing the size and surface area of the parts to be cleaned and set up before starting a new production cycle.

In keeping with these aims, the invention provides a tablet press machine including a fixed casing which houses a compression assembly comprising a power-driven rotor that rotates about a defined axis, the rotor including a matrix disc and another two discs on both sides of it, each mounting at least one pair of reciprocating punches opposite and aligned with each other, the matrix having at least one through matrix where the pair of reciprocating punches is mounted in such a way as to delimit between the single punches forming the pair an empty space of variable size designed to contain a dosed quantity of powder to be compressed; a first set of cams and a second set of cams, both associated with the compression assembly and which, as the rotor rotates, impart on the punches a driving motion which moves them cyclically towards and away from each other in such a way as to compress the powder contained in the matrix in the matrix disc; the machine being characterised in that the casing comprises, inside it, sealed separating means designed to delimit separate spaces for housing the compression assembly and at least one of the two sets of cams, that is to say, either the first set of cams or the second set of cams.

BRIEF DESCRIPTION OF THE DRAWINGS

The technical characteristics of the invention, with reference to the above aims, are clearly described in the claims below and its advantages are apparent from the detailed description which follows, with reference to the accompanying drawings which illustrate a preferred embodiment of the invention provided merely by way of example without restricting the scope of the inventive concept, and in which:

DESCRIPTION OF ILLUSTRATIVE EMBODIMENT

With reference to the accompanying drawings, the numeral 1 denotes in its entirety a tablet press machine, used to make tablets, especially pharmaceutical tablets, by compressing a suitably formulated powder or granular product under high pressure.

Figure 1:
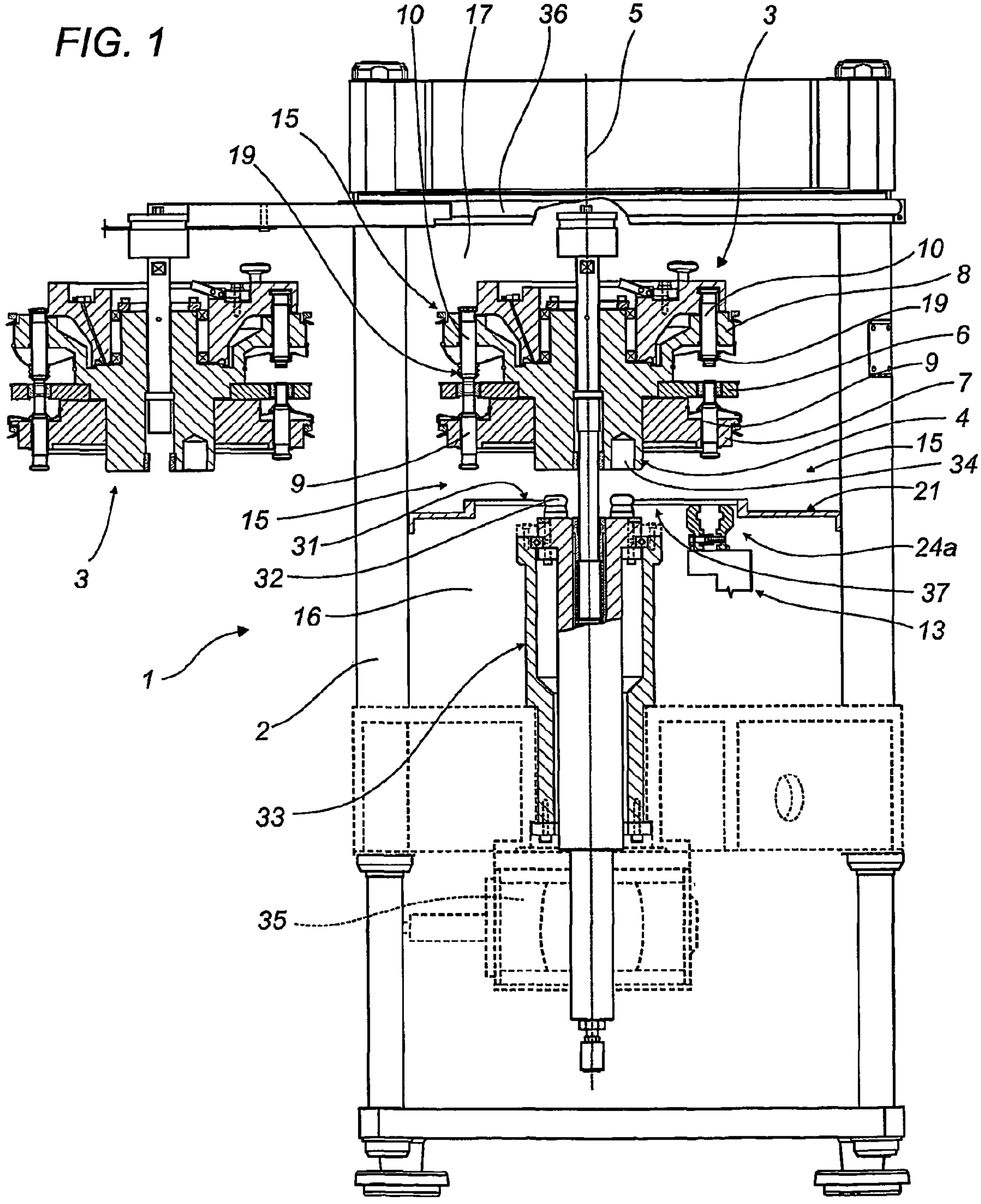
FIG. 1 is a front view, with some parts cut away in order to better illustrate others, of a tablet press according to the present invention, equipped with a compression assembly shown in two different positions, namely, a working position and a maintenance position.

As illustrated in FIG. 1, the machine 1 essentially includes a fixed casing 2 which houses a compression assembly, labelled 3 its entirety, comprising a power-driven rotor 4 that rotates about a vertical axis 5.

The rotor 4 is equipped with a matrix disc 6 and another two discs 7, 8 positioned on both sides of, and rotating with, the matrix disc 6. The two discs 7, 8 mount two sets of reciprocating punches 9, 10, namely, a lower set of punches 9 and an upper set of punches 10.

The punches 9,10 are mounted in such a way as to project towards the matrix disc 6 and are positioned opposite each other in pairs, aligned in a vertical direction parallel to the axis of rotation 5 of the rotor 4.

Figure 2:
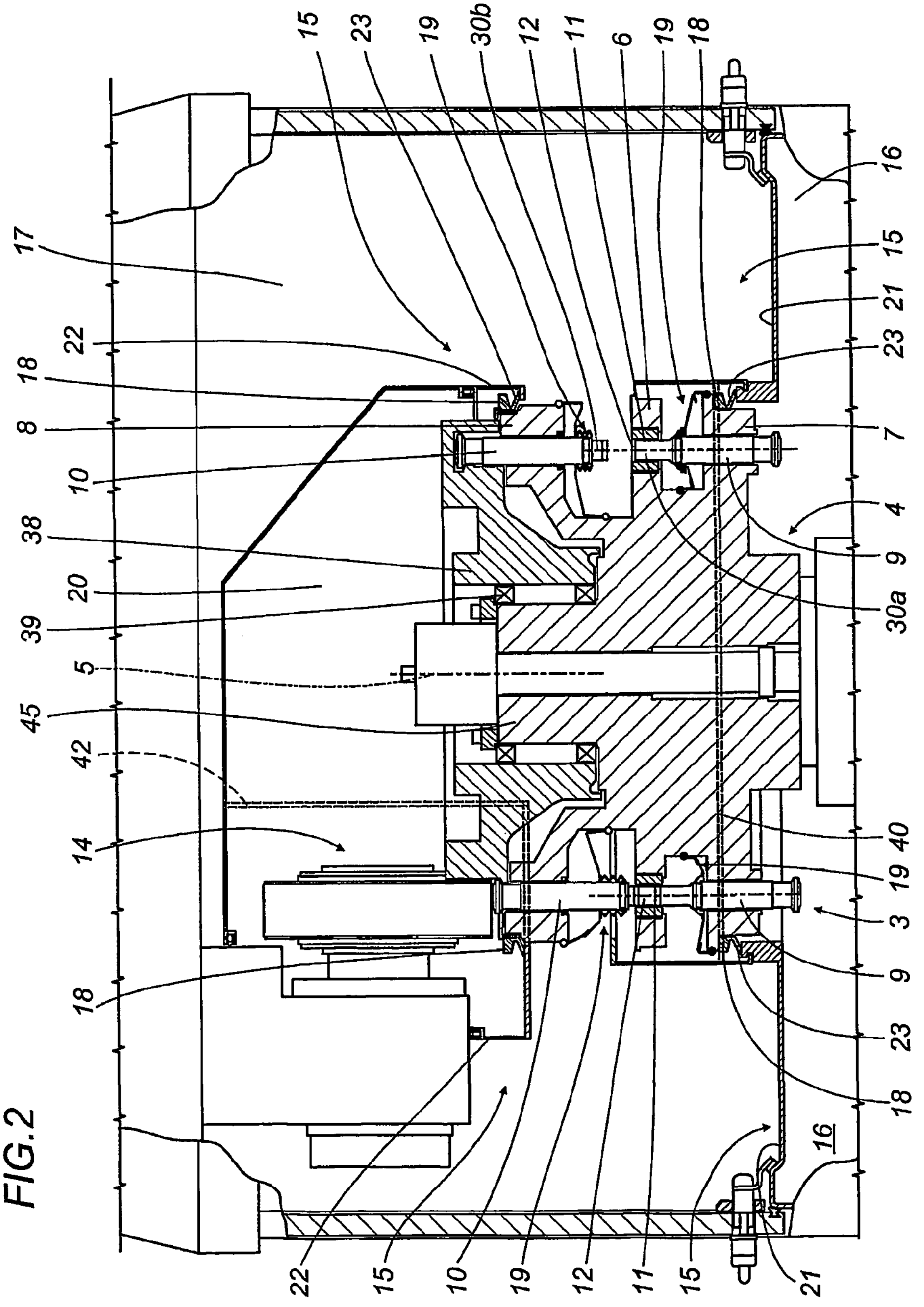
FIG. 2 is an enlarged front view of a detail of the machine illustrated in FIG. 1 in a working position.
Figure 3:
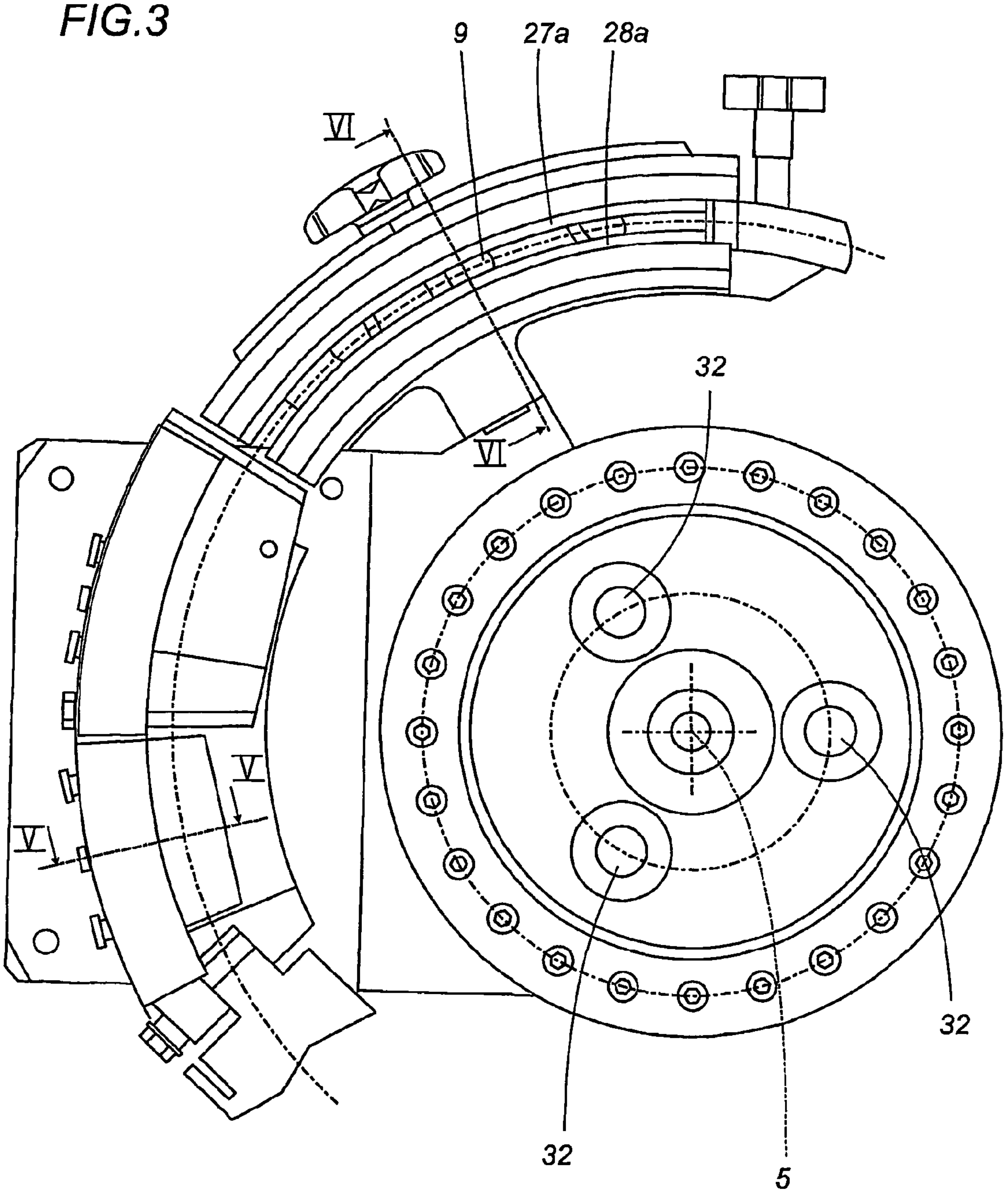
FIG. 3 is a top plan view, with some parts cut away in order to better illustrate others, of the machine shown in FIGS. 1 and 2.

As shown in FIG. 2, the matrix disc 6 has a plurality of through matrixes 11 distributed around its periphery.

Each matrix 11 is associated, at opposite ends of it, with two punches 9, 10 having work heads 30*a* and 30*b* (FIGS. 2, 4*a*, 4*b*, 5*a*, 5*b*) that engage with the matrix 11 in such a way as to delimit an empty space 12 between them designed to contain a dosed quantity of powder.

As shown in FIGS. 1 and 2, the punches 9 and 10 are associated with the matrixes 11 in such a way as to move relative to them towards and away from each other, thus changing the volume that holds the powdered material from a maximum level, when it receives a suitably dosed quantity of powdered product, to a minimum level when it compresses the powdered product under high pressure.

The drive and synchronisation of the punches 9, 10 with the rotational motion imparted on them by the rotation of the rotor 4, are accomplished by a first and a second set of cams, labelled 13 and 14 in their entirety (FIGS. 1 and 2), which are associated with the compression assembly 3 in such a way as to impart on the punches 9, 10 a cyclic reciprocating motion towards and away from each other.

As shown in FIGS. 1 and 2, the casing 2 comprises, inside it, sealed separating means, labelled 15 in their entirety, designed to delimit spaces 16, 17, 20 separate from the casing 2 and from each other and designed to house, respectively, the compression assembly 3, the first set of cams 13, positioned below the compression assembly 3, and the second set of cams 14, positioned above the compression assembly 3.

Looking in more detail, the space labelled 17 consists of a sealed, watertight chamber where the compression assembly 3 works during the operating cycle described above. At the end of a cycle of production of one type of product, the chamber 17 must be completely and thoroughly cleaned using spraying means (of customary type and therefore not illustrated) which perform a complete sterilisation and drainage cycle to remove all impurities from the chamber 17.

With reference again to FIGS. 1 and 2, the separating means 15, whose primary function is to prevent communication between the spaces 16, 17, 20, so that the powdered material processed by the compression assembly 3 during operation of the machine 1 cannot settle on the cams 13 and 14, comprise walls 21, 22 suitably distributed in the casing 2 and equipped with hermetic sealing means 18, 19.

A first wall 21, shaped preferably like a plain, flat disc, with a central hole, is positioned just under the lower disc 7 of the compression assembly 3, between the rotor 4 and the lower set of cams 13 used to drive the lower punches 9 of the rotor 4.

A second wall 22, with a complex shape, delimits inside the casing 2, a sort of top enclosure which contains the set of cams 14 used to drive the upper punches 10, and which is associated with the rotor 4 at the periphery of the upper disc 8.

In practice, the two walls 21 and 22, together with the outer walls of the machine 1, delimit the intermediate space 17, and, above and below it, the spaces 16 and 20 that house the sets of cams 13 and 14.

The aforementioned seals include seals 19 of static type and seals 18 of dynamic type, suitably combined with each other.

The static seals 19 are embodied by concertinaed tubular elements acting between the punches 9, 10 and the related mounting discs 7, 8, being attached to each other.

The dynamic seals 18, acting between the rotor 4 of the compression assembly 3 and the fixed walls 21 and 22 of the fixed casing 2, comprise ring-shaped seals 18 with a lip 23 and a substantially "V" shaped cross section.

The seals 18, 19 described above make it possible, advantageously, to reduce the number and surface area of the parts of the machine 1 that can be contaminated by the powdered product being processed, which means that when the compression assembly 3, as described in prior art, is lifted out of the casing 2 for cleaning and also to gain access to the part of the machine 1 that contains the compression assembly 3 itself, cleaning is quicker and easier.

As shown in FIGS. 1, 3, 4*a*, 4*b*, 5*a* and 5*b*, the machine 1 further comprises, under the rotor 4, a face clutch 31, with pins 32, and releasable connecting means 24*a* operating between the punches 9 on the lower disc 7 and the cams 13 below.

The face clutch 31 is mounted between the rotor 4 and an underlying tubular shaft 33 that is coaxial with the rotor 4 and power-driven by a motor 35.

The clutch 31 permits transmission of rotational drive motion to the rotor 4 by inserting the pins 32 into corresponding cavities 34 in the rotor 4.

Figure 4:
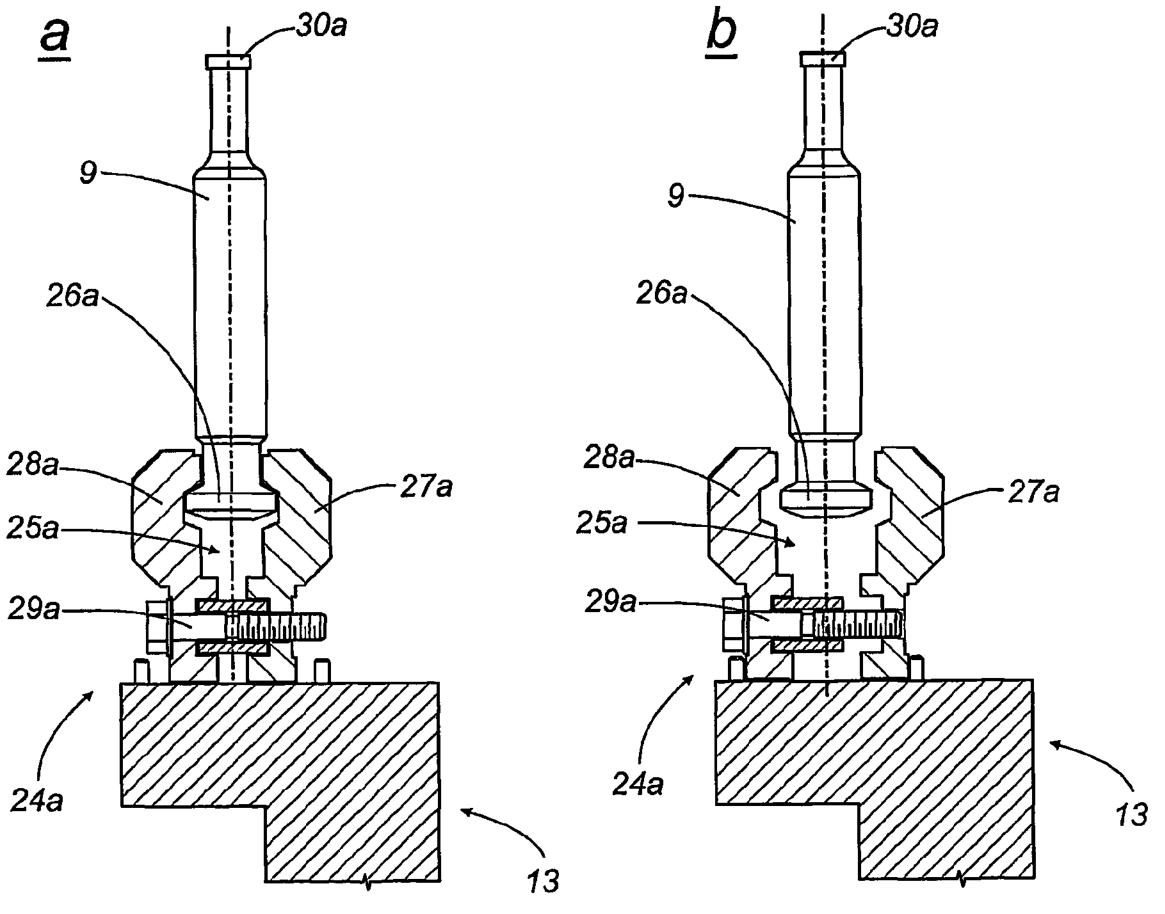
FIGS. 4*a*, 4*b* and 5*a*, 5*b* are section views through lines IV—IV and V—V, respectively, showing two details from FIG. 3 in two conditions, namely, a condition in which the machine is working and a rest condition in which it can be set up for a new production cycle.

With reference to FIGS. 4*a* and 4*b*, the releasable connection means 24*a* comprise a guide 25*a* forming part of the set of cams 13 and whose cross section is shaped to match the substantially rounded heads 26*a* of the punches 9 in such a way that it encompasses them.

The guide 25*a* includes separate component parts 27*a*, 28*a* which can be moved towards and away from each other transversally to the direction in which the guide 25*a* extends.

Actuating means, which may include one or more drive screws 29*a*, preferably hand-operated, are connected with the guide 25*a* in such a way as to move the component parts 27*a*, 28*a* between end limit positions where the component parts 27*a* and 28*a* (see FIG. 4*a*) are close together and the heads 26*a* of the punches 9 are held within the guide 25*a*, or vice versa, where the component parts 27*a* and 28*a* (see FIG. 4*b*) are apart, so as to allow the heads 26*a* positioned between them to be released and removed from the guide 25*a*.

The releasing of the lower set of cams 13 from the punches 9 allows the compression assembly 3 to be lifted out, while leaving the lower set of cams 13 inside the space 16. The latter can then be closed with a sealed cover 40 (see dashed line in FIG. 2) during cleaning and/or sterilisation and/or maintenance operations.

Similarly, in the event of maintenance on the upper set of cams 14 inside the machine, a second sealed cover 42 (shown by another dashed line in FIG. 2) can be fitted while routine cleaning and/or sterilisation is in progress inside the space 17 (when the compression assembly 3 is removed).

When the machine 1 is made according to the invention as described above, it adds to the above mentioned advantages of reducing the number of parts affected by the contaminating action of the powdered product being processed, the further advantage of not requiring removal of the set of cams 13 under the compression assembly 3, or even of both sets of cams 13 and 14 when a production cycle with a different powdered product is commenced.

Indeed, thanks to the separating means described above, the set of cams 13 and the mechanical transmission system formed by the clutch 31 and the drive shaft 33 are not normally contaminated by the powdered product being processed.

Hence, once the compression assembly 3 has been released from the clutch 31 pins 32 and from the component parts 27 and 28*a* of the guides, the compression assembly 3 itself can be lifted out and slid horizontally out of the casing 2 (as illustrated schematically in FIG. 1 showing a preferred embodiment of the invention) along appropriate horizontal guides 36 so that it can be set up or substituted for a new production, while all the mechanical parts under the horizontal disc-shaped wall 21 can be protected by closing an open, central part of it 37, which is acted upon by the lips 23 of the "V" seals. This can be accomplished using a suitable sealed cover 40, as in the embodiment described above.

In the embodiment described so far, the compression assembly 3 of the machine 1 can be removed from the casing 2 only separately from the first set of cams 13, that is to say, the cams 13 located under the compression assembly 3. FIG. 2 shows that removal of the compression assembly 3 involves the simultaneous removal of the top enclosure which delimits the space 20 above the compression assembly 3 and which houses the upper set of cams 14.

As mentioned above, the set of cams 14 can be slid out of the casing 2 since the set of cams 14 is connected to the rotor 4 by a fixed flange 38 with rolling bearings 39 placed between the flange 38 and a hub 45 of the rotor 4.

A further improvement falling within the scope of the inventive concept and obvious to anyone in the trade with normal technical skills can be easily imagined by observing that even the set of cams 14 located above the compression assembly 3 can be constructed in such a way as to be releasable from the punches 10 to remain stably inside the casing 2, while the compression assembly 3 is taken out.

Figure 5:
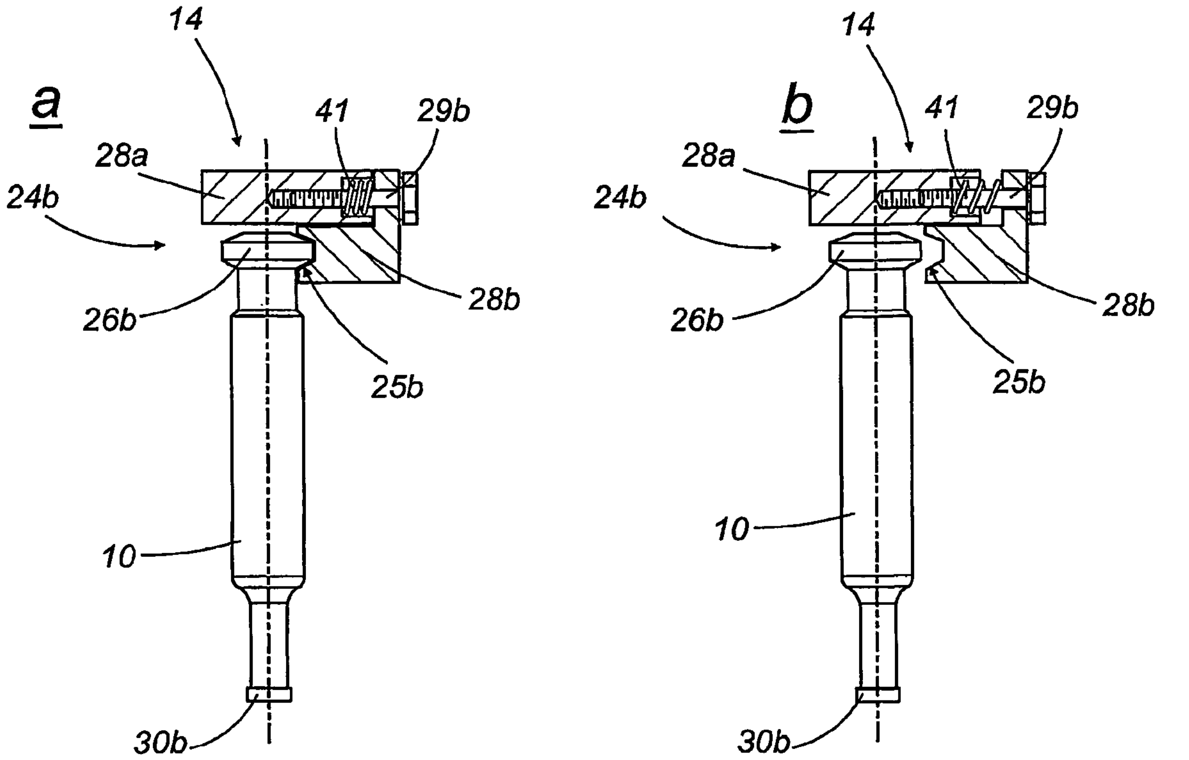

As shown in FIGS. 5*a* and 5*b*, this can be accomplished in the same way as described above for the lower punches 9 of the compression assembly 3.

Indeed, FIGS. 5*a* and 5*b* show that the punches 10 can be connected to connecting means 24*b* comprising guides 25*b* having two component parts 28*a* and 28*b*, which are shaped to match the heads 26*b* of the punches 10, and which can be moved towards and away from each other using one or more drive screws 29*b*, acting in conjunction, if necessary, with elastically yielding reaction means 41.

It will be understood that the invention described may be useful in many industrial applications and may be modified and adapted in several ways without thereby departing from the scope of the inventive concept. Moreover, all the details of the invention may be substituted by technically equivalent elements.

What is claimed is:

1. A tablet press machine including a fixed casing which houses a compression assembly comprising:

a power-driven rotor that rotates about an axis, the rotor including a matrix disc and another two discs on both sides of the rotor, each disc mounting at least one pair of reciprocating punches opposite and aligned with each other, the matrix disc having at least one through matrix where the at least one pair of reciprocating punches is mounted to delimit between the at least one pair of reciprocating punches an empty space of variable size designed to contain a dosed quantity of powder to be compressed;

a first set of cams and a second set of cams both associated with the compression assembly and which, as the rotor rotates, impart on the at least one pair of reciprocating punches a driving motion which moves the at least one pair of reciprocating punches cyclically towards and away from each other to compress the powder contained in the matrix in the matrix disc;

sealed separating means designed to delimit separate spaces for housing the compression assembly and at least one of the first set of cams or the second set of cams; and releasable connecting means operating between at least one punch and a corresponding set of cams to enable the compression assembly to be removed from the casing separately from at least one of the first set of cams or the second set of cams.

2. The machine according to claim 1, wherein the sealed separating means is positioned inside the casing and separates the compression assembly from the first set of cams, which is located under the compression assembly.

3. The machine according to claim 1 or 2, wherein the sealed separating means is positioned inside the casing and separates the compression assembly from the second set of cams, which is located above the compression assembly.

4. The machine according to claim 1, wherein the sealed separating means comprises at least one seal designed to close the spaces such that the spaces do not intercommunicate.

5. The machine according to claim 4, wherein the seal comprises at least one static seal associated with the punches.

6. The machine according to claim 4, wherein the seal comprises at least one dynamic seal acting between the compression assembly and the casing.

7. The machine according to claim 6, wherein the sealed separating means comprises at least one wall of the casing positioned between the compression assembly and at least one of the first set of cams or the second set of cams, the dynamic seal being positioned between the rotor and the wall of the casing.

8. The machine according to claim 4, wherein the seal comprises at least one ring-shaped seal.

9. The machine according to claim 8, wherein the ring-shaped seal has a substantially "V" shaped cross section.

10. The machine according to claim 5, wherein the static seal comprises a concertinaed tubular element associated with the reciprocating punches.

11. The machine according to claim 4, wherein the sealed separating means comprises a first cover which, when the compression assembly is moved away from the space, is associated with the seal to seal off the opening between the two spaces.

12. The machine according to claim 7, wherein the sealed separating means comprises a second cover which, when the compression assembly is moved away from the space, is placed in contact with the wall to form a sealed subdivision between the two spaces.

13. The machine according to claim 1, wherein at least one of the first set of cams or the second set of cams comprises at least one guide whose cross section is shaped to match at least substantially rounded ends of the at least one pair of reciprocating punches wherein the guide encompasses the ends of the at least one pair of reciprocating punches; the guide comprising two separate parts which can be moved towards and away from each other, transversally to the direction in which the guide extends, between two end limit positions where the ends of the at least one pair of reciprocating punches are held within the guide and where the ends of the at least one pair of reciprocating punches are released by the guide.

14. The machine according to claim 13, further comprising actuating means designed to enable the guide to move between said end limit positions.

15. The machine according to claim 14, wherein the actuating means comprises a hand-operated drive screw.

16. The machine according to claim 14, wherein the actuating means comprises an elastically yielding reaction means.

* * * * *